(12) United States Patent
Yun et al.

(10) Patent No.: US 12,282,164 B2
(45) Date of Patent: Apr. 22, 2025

(54) AUGMENTED REALITY DEVICE

(71) Applicant: SAMSUNG ELECTRONICS CO., LTD., Suwon-si (KR)

(72) Inventors: Jeonggeun Yun, Suwon-si (KR); Jaeyeol Ryu, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 17/967,568

(22) Filed: Oct. 17, 2022

(65) Prior Publication Data

US 2023/0110896 A1    Apr. 13, 2023

Related U.S. Application Data

(63) Continuation of application No. PCT/KR2022/015129, filed on Oct. 7, 2022.

(30) Foreign Application Priority Data

Oct. 8, 2021 (KR) ......................... 10-2021-0134469
Jun. 14, 2022 (KR) ......................... 10-2022-0072353

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0055* (2013.01); *G02B 6/0056* (2013.01); *G02B 2027/0178* (2013.01)

(58) Field of Classification Search
CPC .................................................. G02B 27/017
See application file for complete search history.

(56) References Cited

U.S. PATENT DOCUMENTS 10,359,635 B2    7/2019  Grey et al.
10,551,622 B2    2/2020  Robbins et al.
(Continued)

FOREIGN PATENT DOCUMENTS

CN           211905863 U    11/2020
KR      10-2017-0010042 A    1/2017
(Continued)

OTHER PUBLICATIONS

International Search Report and Written Opinion (PCT/ISA/220, PCT/ISA/210, and PCT/ISA/237) dated Jan. 31, 2023, issued by International Searching Authority for International Application No. PCT/KR2022/015129.

*Primary Examiner* — Eric Wong
(74) *Attorney, Agent, or Firm* — Sughrue Mion, PLLC

(57) ABSTRACT

An augmented reality (AR) device is provided. The AR device includes a display configured to output light of a first polarization; a polarization-conversion reflector provided opposite to an output side of the display, the polarization-conversion reflector converting the light of the first polarization into light of a second polarization that is orthogonal to the first polarization and reflect the light of the second polarization; a waveguide having a flat plate shape, a normal line of a flat surface of the flat plate shape being inclined with respect to an optical axis of the light of the first polarization output from the display, a side of the waveguide being provided between the display and the polarization-conversion reflector; an input-coupler inputting the light of the second polarization into the waveguide; and an output-coupler outputting light propagating in the waveguide.

16 Claims, 12 Drawing Sheets

(56) References Cited

U.S. PATENT DOCUMENTS

| | | | |
|---|---|---|---|
| 10,859,768 B2 | 12/2020 | Popovich et al. | |
| 10,969,675 B1 * | 4/2021 | Wheelwright | G02B 27/0172 |
| 11,846,779 B2 * | 12/2023 | Jamali | G02B 27/0172 |
| 2009/0027772 A1 | 1/2009 | Robinson | |
| 2010/0328794 A1 | 12/2010 | Levola et al. | |
| 2017/0059869 A1 | 3/2017 | Lee | |
| 2018/0120559 A1 * | 5/2018 | Yeoh | G02B 6/0016 |
| 2021/0278739 A1 | 9/2021 | Brown et al. | |
| 2022/0390749 A1 | 12/2022 | Yun et al. | |

FOREIGN PATENT DOCUMENTS

| | | |
|---|---|---|
| KR | 10-1742984 B1 | 6/2017 |
| KR | 10-2019-0066075 A | 6/2019 |
| KR | 10-2021-0114793 A | 9/2021 |
| WO | 2020/069400 A1 | 4/2020 |

* cited by examiner

AUGMENTED REALITY DEVICE

CROSS-REFERENCE TO RELATED APPLICATIONS

This application is a continuation application of International Application No. PCT/KR2022/015129, filed on Oct. 7, 2022, which is based on and claims priority to Korean Patent Application No. 10-2022-0072353, filed on Jun. 14, 2022, and Korean Patent Application No. 10-2021-0134469, filed on Oct. 8, 2021, in the Korean Intellectual Property Office, the disclosures of which are incorporated by reference herein in their entireties.

BACKGROUND

1. Field

The disclosure relates to an augmented reality (AR) device, and more particularly, to an AR device including a waveguide.

2. Description of Related Art

An augmented reality (AR) device provides AR, and includes, for example, AR glasses. An image optical system of an AR device includes a display engine (a projector, etc.) that outputs an image and a waveguide that transmits the output image to the eyes of a user. An image emitted from the display engine is transmitted to the eyes through the waveguide, allowing the user to see the image.

A wearable display device is a device that enables the user while wearing the wearable display device to see a displayed screen. As such wearable display devices are actively being researched, various forms of wearable devices are currently or are expected to be released on the market. For example, a glasses-type display device (e.g., wearable glasses) or a head-mounted display device may be an example of a wearable display device currently released or expected to be released on the market. To use an AR device as a wearable display device, the AR device needs to have appearance structure and fit that does not discomfort a general user.

SUMMARY

Provided is an augmented reality (AR) device including a tilted waveguide.

Further, provided is a glasses-type display device which alleviates limitations of an appearance shape thereof by improving mechanical arrangement.

The technical problems of the disclosure are not limited to the aforementioned technical features, and other unstated technical problems may be inferred from embodiments below.

According to an aspect of the disclosure, an augmented reality (AR) device includes: a display configured to output light of a first polarization; a polarization-conversion reflector provided opposite to an output side of the display, the polarization-conversion reflector converting the light of the first polarization into light of a second polarization that is orthogonal to the first polarization and reflecting the light of the second polarization; a waveguide having a flat plate shape, a normal line of a flat surface of the flat plate shape being inclined with respect to an optical axis of the light of the first polarization output from the display, a side of the waveguide being provided between the display and the polarization-conversion reflector; an input-coupler inputting the light of the second polarization into the waveguide; and an output-coupler outputting light propagating in the waveguide.

The display may be provided at a side of the waveguide from which the light is output from the waveguide by the output-coupler.

The display may include: a display engine configured to output image light; and a polarization converter converting the image light output from the display engine into the light of the first polarization.

The polarization converter may include a circular polarizer polarization-converting the light output from the display engine into light of circular polarization, and the polarization-conversion reflector may include a reflective mirror.

The polarization converter may include a linear polarizer and a ¼ wave plate that are arranged along a traveling path of the light output from the display engine, and the polarization-conversion reflector may include a reflective mirror.

The polarization converter further may include a ½ wave plate provided between the linear polarizer and the ¼ wave plate.

The display engine may be further configured to output image light of linear polarization, the polarization converter may include a ¼ wave plate, and the polarization-conversion reflector may include a reflective mirror.

The first polarization may be right-circular polarization, and the input-coupler may be a left-circular polarization diffraction grating diffracting light of left-circular polarization.

The first polarization may be left-circular polarization, and the input-coupler may be a right-circular polarization diffraction grating diffracting light of right-circular polarization.

The polarization converter may include a linear polarizer polarization-converting the light output from the display engine into light of linear polarization, and the polarization-conversion reflector may include a reflective mirror, and a ¼ wave plate provided between the waveguide and the reflective mirror.

The polarization converter may include a linear polarizer and a ½ wave plate that are arranged along a traveling path of the light output from the display engine, and the polarization-conversion reflector may include a reflective mirror and a ¼ wave plate arranged between the waveguide and the reflective mirror.

The first polarization may be x-axis linear polarization, and the input-coupler may be a y-axis linear polarization diffraction grating diffracting light of y-axis linear polarization.

The first polarization may be y-axis linear polarization, and the input-coupler may be an x-axis linear polarization diffraction grating diffracting light of x-axis linear polarization.

The AR device may be AR glasses and further may include a frame and temples connected at opposite ends of the frame, and the display may be mounted in at least one side of the temples.

The AR device may be AR glasses or a head-mounted display device.

One or more embodiments of the disclosure provide an augmented reality (AR) device that may have a natural glasses-type appearance by tilting a waveguide.

One or more embodiments of the disclosure also provide an AR device that may not reduce a viewing angle even when the waveguide is tilted.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
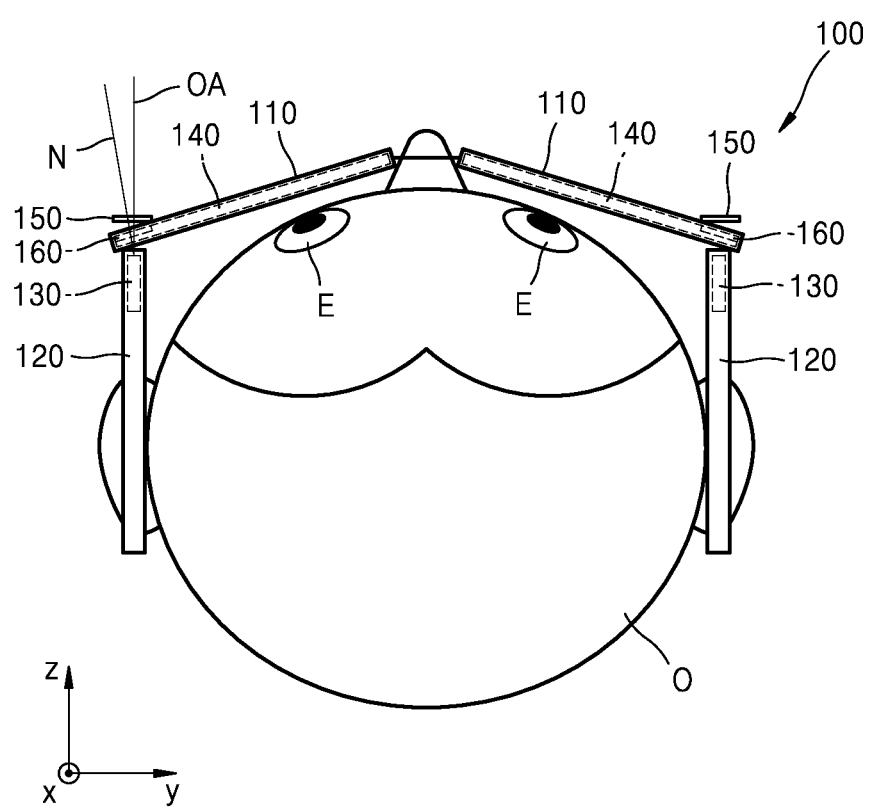
FIG. 1 illustrates an example of a user wearing an augmented reality (AR) device, according to an embodiment of the disclosure.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Although terms used in embodiments of the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of an embodiment of the disclosure. Thus, the terms used in herein should be defined not by the simple names of the terms but by the meaning of the terms and the contents throughout the disclosure.

Singular forms include plural forms unless apparently indicated otherwise contextually. When an element "comprises" or "includes" a component, the element may not exclude another component but may further include another component unless stated otherwise.

Hereinafter, the disclosure will be described with reference to the accompanying drawings.

FIG. 1 illustrates an example where a user wears an augmented reality (AR) device, according to an embodiment of the disclosure.

Figure 2:
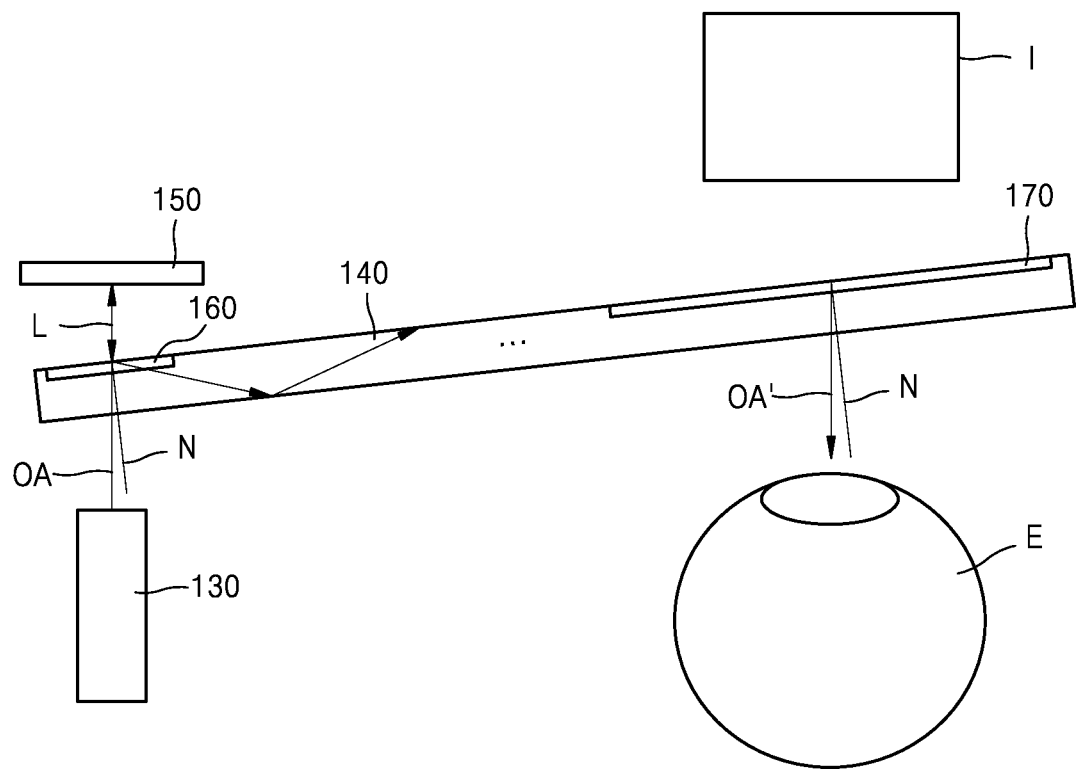
FIG. 2 is a view for describing an operation of an AR device, according to an embodiment of the disclosure.

Referring to FIGS. 1 and 2, an AR device 100 according to the current embodiment of the disclosure may be a glasses-type display device configured to be worn by a user and may be AR glasses.

The AR device 100 may include a glasses-type body including a frame 110 and temples 120. The frame 110 may have, for example, a shape of two rims connected by a bridge. The rims of the frame 110 and the bridge may not be distinguished from each other. The temples 120 may be respectively connected to both ends of the frame 110 and extend in a direction. The both ends of the frame 110 and the temples 120 may be connected by, for example, a hinge. In another example, the frame 110 and the temples 120 may be integrally connected.

In the glasses-type body, a display unit (display) 130 may be mounted. The display unit 130 may be configured to output light of first polarization including a virtual image. In an embodiment of the disclosure, the display unit 130 may be a projector configured to output the light of the first polarization. The display unit 130 may include, but is not limited to, a polarizer for making light output to an output end into the light of the first polarization. In another example, the display unit 130 may emit light polarized by a light source and may use a polarizing beam splitter, etc., to branch or combine light. The first polarization may be, for example, left-circular polarization, right-circular polarization, or linear polarization.

In an embodiment of the disclosure, the display unit 130 may be mounted on the temples 120. In an embodiment of the disclosure, the display unit 130 may be mounted on the temples 120 such that an optical axis direction OA of output light of the display unit 130 coincides with a longitudinal direction of the temples 120, without being limited thereto. In another example, a part of the display unit 130 may be fixed on the temples 120 and another part of the display unit 130 may be fixed on the frame 110 (a rim shape). When the frame 110 and the temples 120 are integrally formed, the mounted position of the display unit 130 may not be separated into the frame 110 and the temples 120. The display unit 130 may be provided at a position corresponding to each or one of the left eye and the right eye.

A waveguide 140 may be mounted in the frame 110. The waveguide 140 may transmit light of the virtual image generated in the display unit 130 and light of an external scene to a pupil of the user. The waveguide 140 may have a shape of a flat plate. The waveguide 140 may be formed as a single layer or multiple layers of a transparent material in which the light may propagate while being internally reflected. Herein, the transparent material may refer to a material through which light in a visible light band passes, and a transparency thereof may not be 100% and the transparent material may have a certain color. As the waveguide 140 is formed of a transparent material, the user may see not only a virtual image, but also the real scene through the AR device 100, which may thus implement AR. The waveguide 140 may be provided at a position corresponding to each or one of the left eye and the right eye to correspond to the display unit 130.

The waveguide 140 may be mounted on the frame 110 in a tilted or inclined state with respect to the display unit 130. In other words, a flat surface of the waveguide 140 may not be orthogonal to the optical axis direction OA of the output light of the display unit 130. That is, a normal line N of the flat surface of the waveguide 140 may be tilted with respect to the optical axis direction OA of the output light of the display unit 130. While FIG. 1 shows a case where the tilted direction of the waveguide 140 is a direction of rotation with respect to a vertical direction (an x axis), the disclosure is not limited thereto. In another example, the waveguide 140 may be tilted in a direction of rotation with respect to the horizontal direction (e.g., a y axis), or may be tilted in both the vertical direction and the horizontal direction. Such a tilt of the waveguide 140 causes the waveguide 140 to be in a tilted state with respect to a facial portion of a user O when seen by the user O wearing the AR device 100, thus providing an appearance that is similar to normal vision correction glasses or sunglasses.

In an embodiment of the disclosure, glasses may be located on the frame 110, and in this case, the waveguide 140 may be arranged by being attached to the glasses or may be fixed on the frame 110 separately from the glasses. The glasses may be omitted.

A polarization-conversion reflection unit (polarization-conversion reflector) 150 may be opposed to an output side of the display unit 130. A side of the waveguide 140 may be located between the display unit 130 and the polarization-conversion reflection unit 150. The polarization-conversion reflection unit 150 may be fixed on the frame 110 or attached to the waveguide 140. The polarization-conversion reflection unit 150 may polarization-convert the light of the first polarization output from the display unit 130 into light of second polarization that is orthogonal to the light of the first polarization and reflect the same.

The polarization-conversion reflection unit 150 may be arranged, but is not limited to, such that a normal line of a reflective surface thereof coincides with the optical axis direction OA of the output light of the display unit 130. By adjusting a direction of the reflective surface of the polarization-conversion reflection unit 150, a direction of light output through the waveguide 140 may be adjusted.

In an embodiment of the disclosure, first polarization may be left-circular polarization or right-circular polarization, and the polarization-conversion reflection unit 150 may be a reflective mirror. The reflection mirror may reflect light of left-circular polarization as light of right-circular polarization and reflect light of right-circular polarization as light of left-circular polarization.

In an embodiment of the disclosure, the first polarization may be linear polarization like x-axis linear polarization or y-axis polarization, and the polarization-conversion reflection unit 150 may include a reflective mirror and a ¼ wave plate. The ¼ wave plate may be attached to a reflective surface of the reflective mirror in the form of a film or may be arranged to be separated from the reflective surface of the reflective mirror. A combination of the reflective mirror and the ¼ wave plate may reflect light of the x-axis linear polarization as light of y-axis linear polarization and reflect the light of the y-axis linear polarization as the light of the x-axis linear polarization. Herein, the x-axis and the y-axis may indicate two axes that are orthogonal to each other.

In a side of the waveguide 140 positioned between the display unit 130 and the polarization-conversion reflection unit 150, an input-coupler 160 may be positioned. The input-coupler 160 may be positioned on a first surface facing the display unit 130 of the waveguide 140 or on a second surface opposing the first surface, or inside the waveguide 140 (between layers for a multi-layer waveguide) to input light output from the display unit 130 to the waveguide 140.

The input-coupler 160 may be a polarization diffraction grating that passes through the light of the first polarization and inputs the light of the second polarization, reflected after polarization-converted by the polarization-conversion reflection unit 150, into the waveguide 140.

In an embodiment of the disclosure, the input-coupler 160 may be a left-circular polarization diffraction element that passes through the light of the right-circular polarization and diffracts the light of the left-circular polarization to input the light into the waveguide 140.

In an embodiment of the disclosure, the input-coupler 160 may be a right-circular polarization diffraction element that passes through the light of the left-circular polarization and diffracts the light of the right-circular polarization to input the light into the waveguide 140.

In an embodiment of the disclosure, the input-coupler 160 may be an x-axis linear polarization diffraction element that passes through the light of the y-axis linear polarization and diffracts the light of the x-axis linear polarization to input the light into the waveguide 140.

In an embodiment of the disclosure, the input-coupler 160 may be a y-axis linear polarization diffraction element that passes through the light of the x-axis linear polarization and diffracts the light of the y-axis linear polarization to input the light into the waveguide 140.

The polarization diffraction element may be implemented with a diffractive optical element (DOE), a holographic optical element (HOE), a polymer dispersed liquid crystal (PDLC), a meta surface, etc.

In the other side of the waveguide 140, an output-coupler (see output-coupler 170 of FIG. 2) may be positioned. Light of a virtual image propagating inside the waveguide 140 may be output to a target region through the output-coupler 170. The target region may be an eye motion box (EMB) of a user.

Information processing and image formation for the display unit 130 may be directly performed on a computer of the AR device 100, or may be performed on an external electronic device such as a smart phone, a tablet, a computer, a laptop computer, other intelligent (smart) devices of any type, etc., connected to the AR device 100. Signal transmission between the AR device 100 and the external electronic device may be performed through wired communication and/or wireless communication. The AR device 100 may be supplied with power of at least any one of an embedded power source (a chargeable battery), an external device, or an external power source.

Next, referring to FIGS. 2 and 3, an operation of the AR device 100 according to the current embodiment of the disclosure will be described.

Figure 3:
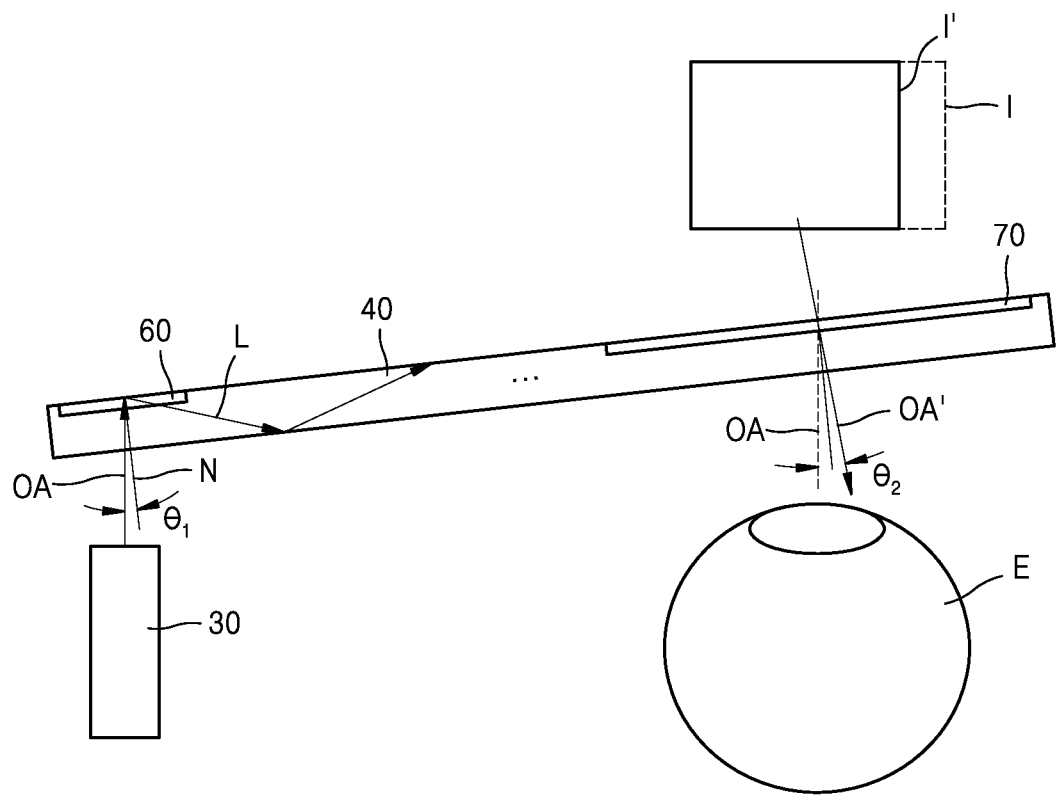
FIG. 3 is a view for describing an operation of an AR device, according to a comparative example.

FIG. 2 is a view for describing an operation of the AR device 100 according to an embodiment of the disclosure, and FIG. 3 is a view for describing an operation of an AR device according to a comparative example.

Referring to FIG. 2, the display unit 130 may output light L of the first polarization including a virtual image. The light L output from the display unit 130 may pass through a side of the waveguide 140 and be directed toward the polarization-conversion reflection unit 150. Even when the input-coupler 160 is on a traveling path of the light L, the input-coupler 160 may diffract the light of the second polarization without diffracting the light of the first polarization orthogonal to the second polarization, such that the light L of the first polarization may pass through the waveguide 140 without being coupled to the waveguide 140.

The polarization-conversion reflection unit 150 may reflect the light L output from the display unit 130 and convert the first polarization into the second polarization. For example, when the first polarization is the right-circular polarization, the polarization-conversion reflection unit 150 may convert the light L output from the display unit 130 into the light of the left-circular polarization. A direction of the light L reflected from the polarization-conversion reflection unit 150 may be opposite to a direction of the light L output from the display unit 130.

The light L reflected from the polarization-conversion reflection unit 150 may be diffracted in the input-coupler 160 and enter the waveguide 140. As the waveguide 140 is inclined, the light L may be incident to the input-coupler 160 at an incident angle that is the same as a tilt angle of the waveguide 140.

The light L entering the waveguide 140 may propagate by being totally reflected inside the waveguide 140, and may be output outside the waveguide 140 by being diffracted in the output-coupler 170. The light L output from the waveguide 140 may be directed toward eyes E of the user, and the user may see the virtual image output from the display unit 130. In this case, an output angle of the light L output through the output-coupler 170 may be substantially the same as the incident angle of the light L when the light L is incident to the input-coupler 160. That is, an optical axis OA' of the light L output through the output-coupler 170 may be parallel to the optical axis OA of the light L output from the display unit 130. Thus, even when the waveguide 140 is inclined with respect to the optical axis OA of the display unit 130, a virtual image I provided by the AR device 100 according to the current embodiment of the disclosure may remain intact and a viewing angle thereof may be maintained. As the viewing angle of the AR device 100 does not depend on inclination of the waveguide 140, even a large tilt angle of the waveguide 140 may be compensated for. Moreover, for the AR device 100 having a different tilt angle of the waveguide 140, it is not necessary to perform again optical designing and the same optical system may be used.

Referring to FIG. 3, for an AR device according to a comparative example, a display unit 30 may output the light L and an input-coupler 60 may propagate the light L output from the display unit 30 into a waveguide 40, and the light L propagating in the waveguide 40 may be output through an output-coupler 70. A normal line N of the waveguide 40 is inclined with respect to the optical axis OA of the display unit 30 at a tilt angle $\theta_1$, such that a tilt angle of the light L input to the input-coupler 60 is equal to the tilt angle $\theta_1$. An output angle of the light L output through the output-coupler 170 may be substantially the same as the incident angle of the light L incident to the input-coupler 60. However, as the waveguide 40 is inclined with respect to the display unit 30, an angle $\theta_2$ between the optical axis OA of the light L output from the display unit 30 and the optical axis OA' of the light L output through the output-coupler 170 is twice the tilt angle $\theta_1$. Thus, when the waveguide 40 is inclined with respect to the optical axis OA of the display unit 30, a virtual image I' provided by the AR device according to the comparative example is narrower than the virtual image I in a non-inclined state of the waveguide 40 and a viewing angle is narrowed.

Figure 4:
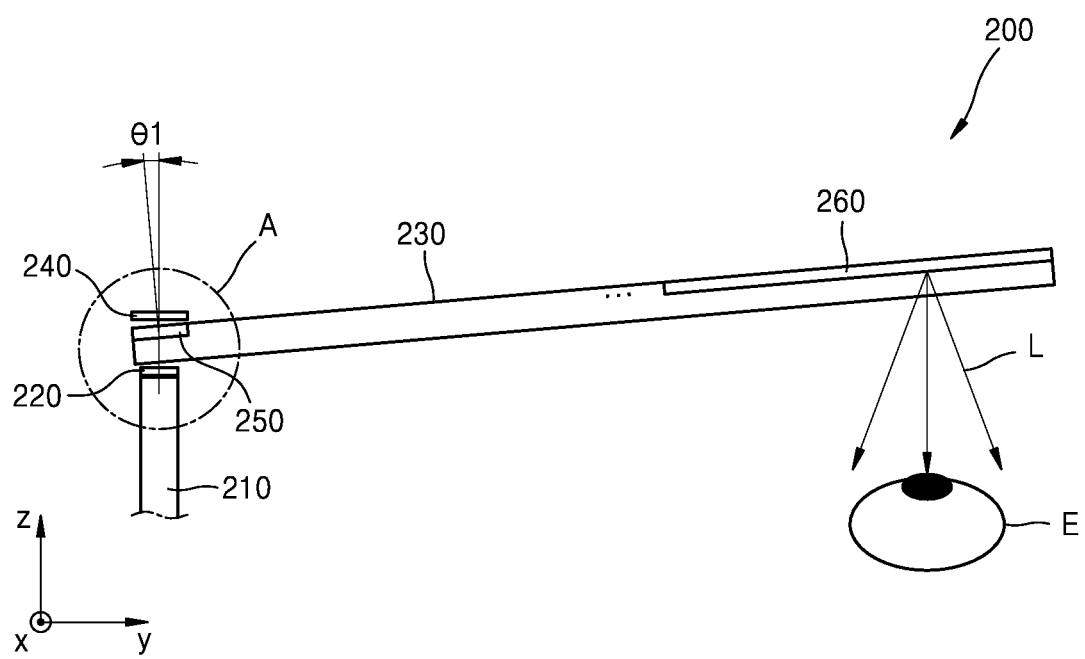
FIG. 4 shows an example in which a waveguide and a display engine are combined with each other in an AR device, according to an embodiment of the disclosure.
Figure 5:
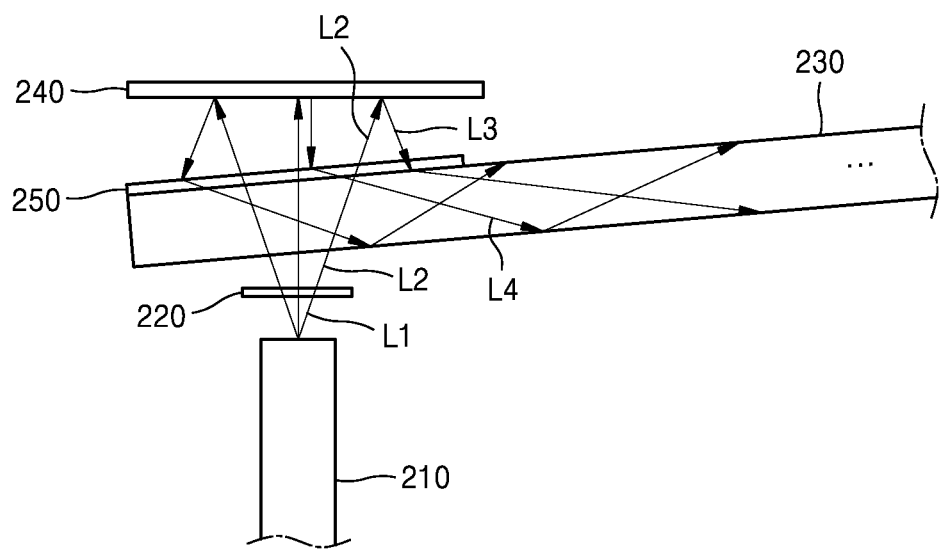
FIG. 5 is an enlarged view of a region A of FIG. 4, as a view for describing a polarization state along a path of light.

FIG. 4 shows an example where a waveguide and a display engine are combined with each other in an AR device 200, according to an embodiment of the disclosure, and FIG. 5 is an enlarged view of a region A of FIG. 5. The AR device 200 according to the current embodiment of the disclosure specifies a case where the first polarization is circular polarization in the AR device 100 described with reference to FIGS. 1 and 2, and it will be understood by those of ordinary skill in the art that the AR device 200 is applicable to a glasses-type body structure of the AR device 100 described with reference to FIGS. 1 and 2.

Referring to FIGS. 4 and 5, the AR device 200 may include a display engine 210 that outputs light L1 of a virtual image, a polarization converter 220, a waveguide 230, and a reflective mirror 240. The light L1 output from the display engine 210 may be, but is not limited to, unpolarized. The display engine 210 and the polarization converter 220 may correspond to the display unit 130 in the AR device 100 described with reference to FIG. 1.

The polarization converter 220 may be a circular polarizer. The circular polarizer may include a linear polarizer and a ¼ wave plate and may be one circular polarizer.

Figure 6:
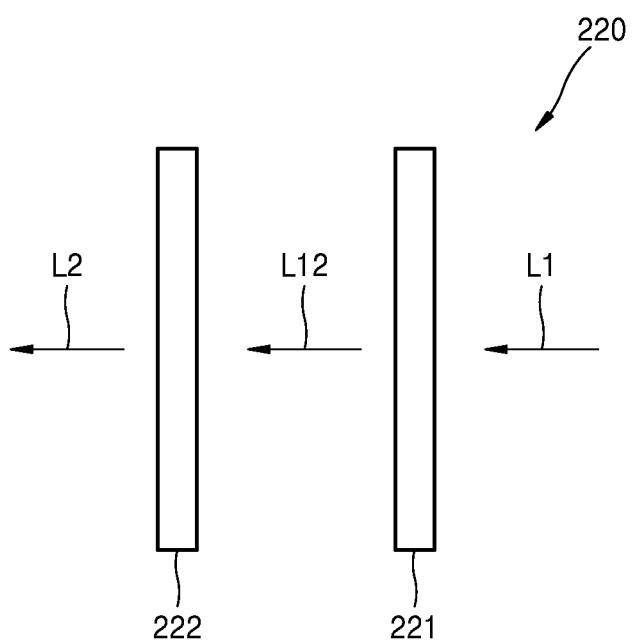
FIG. 6 is a view for describing a polarization converter according to an embodiment of the disclosure.

FIG. 6 is a view for describing the polarization converter 220 according to an embodiment of the disclosure. Referring to FIG. 6, the polarization converter 220 may include a linear polarizer 221 and a ¼ wave plate 222 that are sequentially arranged in a traveling direction of the light L1 output from the display engine 210. The linear polarizer 221 may polarization-convert the light L1 output from the display engine 210 into light L12 of linear polarization. The ¼ wave plate 222 may polarization-convert the light L12 of the linear polarization into light L2 of circular polarization by phase-delaying the light L12 of the linear polarization by a ¼ wavelength. In a direction of the ¼ wave plate 222, the ¼ wave plate 222 may selectively polarization-convert the light L12 of the linear polarization into the light L2 of the right-circular polarization or the left-circular polarization.

In an embodiment of the disclosure, the polarization converter 220 may be a right-circular polarizer that polarization-converts the light L1 output from the display engine 210 into the light L2 of the right-circular polarization. In this case, an input-coupler 250 may be a left-circular polarization diffraction grating that diffracts light L3 of the left-circular polarization without diffracting the light L2 of the right-circular polarization. The light L2 of the right-circular polarization, polarization-converted by the polarization converter 220, may pass through the waveguide 230 without being diffracted by the input-coupler 250. The light L2 of the right-circular polarization passing through the waveguide 230 may be reflected by the reflective mirror 240 and become the light L3 of the left-circular polarization. The light L3 of the left-circular polarization, reflected and polarization-converted by the reflective mirror 240, may enter the waveguide 230 while being diffracted by the input-coupler 250. Light L4 of the left-circular polarization, entering the waveguide 230, may be output outside the waveguide 230 by an output-coupler 270 and be directed toward the eyes E of the user.

In an embodiment of the disclosure, the polarization converter 220 may be a left-circular polarizer that polarization-converts the light L1 output from the display engine 210 into light of left-circular polarization. In this case, the input-coupler 250 may be a right-circular polarization diffraction grating that diffracts light L3 of the right-circular polarization without diffracting the light L2 of the left-circular polarization. The light L2 of the left-circular polarization, polarization-converted by the polarization converter 220, may pass through the waveguide 230 without being diffracted by the input-coupler 250. The light L2 of the left-circular polarization passing through the waveguide 230 may be reflected by the reflective mirror 240 and become the light L3 of the right-circular polarization. The light L3 of the right-circular polarization, reflected and polarization-converted by the reflective mirror 240, may enter the waveguide 230 while being diffracted by the input-coupler 250. The light L4 of the right-circular polarization, entering the waveguide 230, may be output outside the waveguide 230 by the output-coupler 270 and be directed toward the eyes E of the user.

Figure 7:
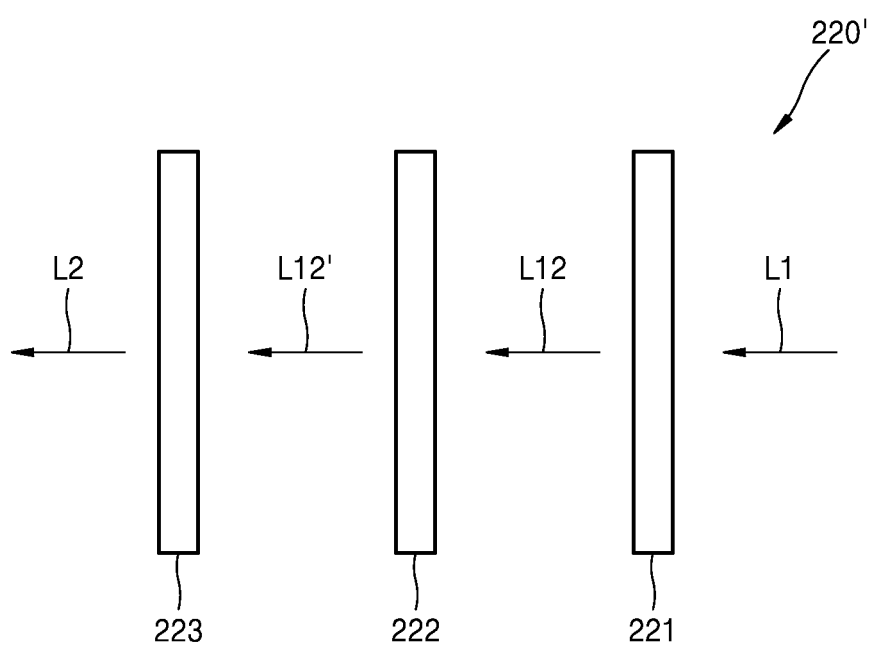
FIG. 7 is a view for describing a polarization converter according to an embodiment of the disclosure.

FIG. 7 is a view for describing a polarization converter 220' according to an embodiment of the disclosure. Referring to FIG. 7, the polarization converter 220' may include a linear polarizer 221, a ½ wave plate 223, and a ¼ wave plate 222 that are sequentially arranged in a traveling direction of the light L1 output from the display engine 210. The polarization converter 220' according to the current embodiment of the disclosure is different from the polarization converter 220 described with reference to FIG. 6, with respect to further including the ½ wave plate 223. The ½ wave plate 223 may be arranged between the linear polarizer 221 and the ¼ wave plate 222. The ½ wave plate 223 may rotate a polarization direction of the light L12 linearly polarized by the linear polarizer 221. The ½ wave plate 223 precisely adjust alignment of the linear polarizer 221 and the ¼ wave plate 222 by rotating the polarization direction of the light L12 linearly polarized by the linear polarizer 221 to match a direction of the ¼ wave plate 222. Reference numeral L12' may indicate linearly polarized light adjusted to match the direction of the ¼ wave plate 222.

Figure 8:
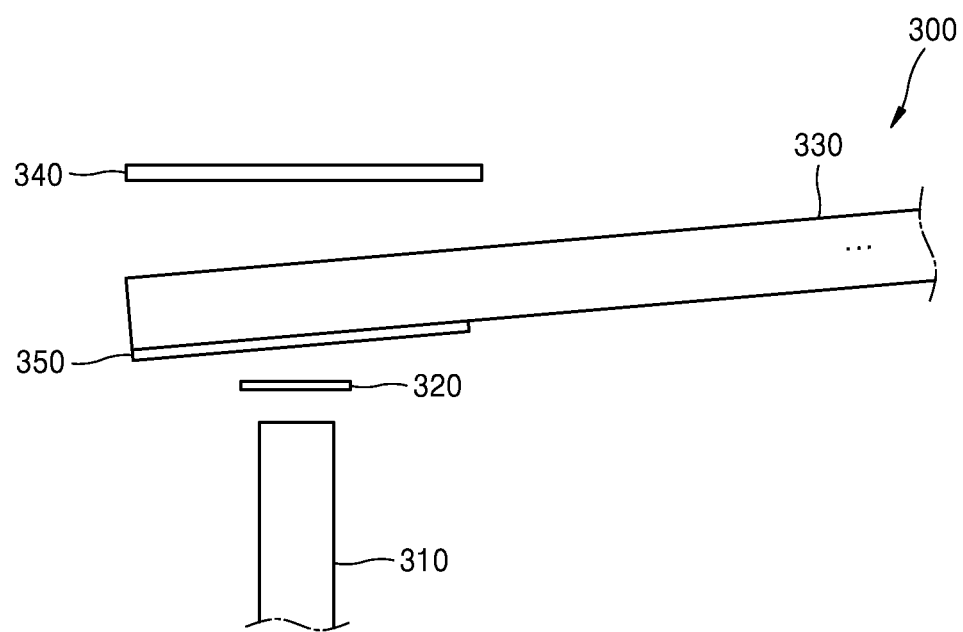
FIG. 8 illustrates an example in which an input-coupler is arranged in an AR device, according to an embodiment of the disclosure.

FIG. 8 illustrates an example where an input-coupler 350 is arranged in an AR device 300, according to an embodiment of the disclosure. Except for a position of the input-coupler 350, the AR device 300 according to the current embodiment of the disclosure may be substantially the same as the AR device according to the above-described embodiments of the disclosure. Referring to FIG. 8, the input-coupler 350 may be positioned on a surface facing a display engine 310 of a waveguide 330. The input-coupler 350 may diffract light of second polarization, which is orthogonal to light of first polarization, without diffracting the light of the first polarization, and propagate the light into the waveguide 330. The light output from the display engine 310 may become the light of the first polarization (e.g., left-circular polarization) by being polarization-converted by a polarization converter 320, and may be incident to the waveguide 330 without being diffracted by the input-coupler 350 and pass through the waveguide 330 to be directed toward a polarization-conversion reflection unit 340. The light of the first polarization (e.g., left-circular polarization) may be polarization-converted into light of second polarization (e.g., right-circular polarization) and reflected, in the polarization-conversion reflection unit 340, and may be incident to the input-coupler 350 through the waveguide 330. The input-coupler 350 may propagate the light of the second polarization (e.g., right-circular polarization), polarization-converted by the polarization-conversion reflection unit 340, into the waveguide 330.

Figure 9:
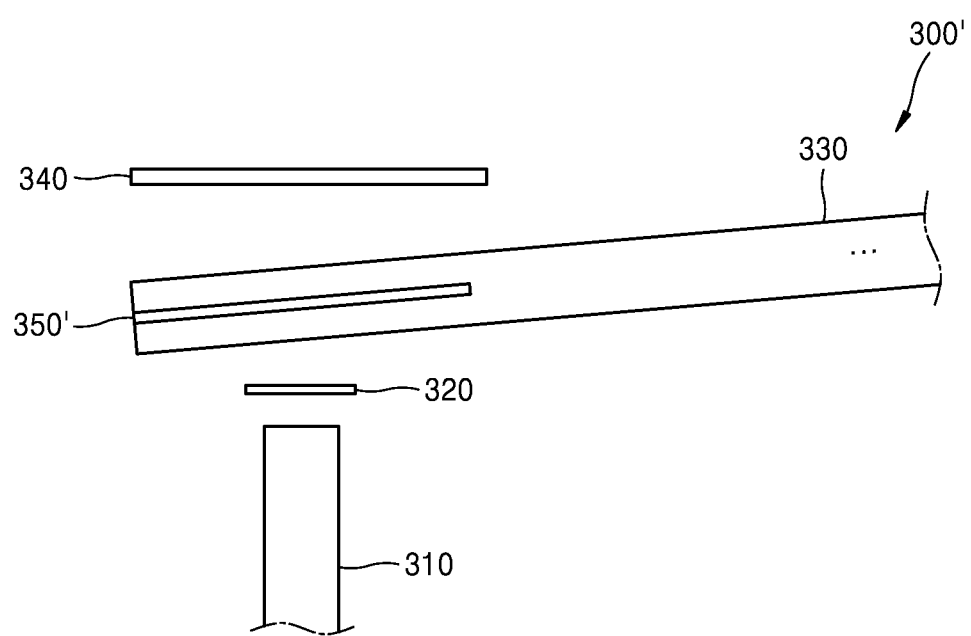
FIG. 9 illustrates an example in which an input-coupler is arranged in an AR device, according to an embodiment of the disclosure.

FIG. 9 illustrates an example where an input-coupler 350' is arranged in an AR device 300', according to an embodiment of the disclosure. Except for a position of the input-coupler 350', the AR device 300' according to the current embodiment of the disclosure may be substantially the same as the AR device according to the above-described embodiments of the disclosure. Referring to FIG. 9, the input-coupler 350' may be positioned inside the waveguide 330. When the waveguide 330 has a multi-layer structure, the input-coupler 350' may be positioned between adjacent layers of the waveguide 330. The input-coupler 350' may diffract light of second polarization, which is orthogonal to light of first polarization, without diffracting the light of the first polarization, and propagate the light into the waveguide 330. The light output from the display engine 310 may become the light of the first polarization (e.g., left-circular polarization) by being polarization-converted by the polarization converter 320, and may be incident to the waveguide 330 without being diffracted by the input-coupler 350' and pass through the waveguide 330 to be directed toward the polarization-conversion reflection unit 340. The light of the first polarization (e.g., left-circular polarization) may be polarization-converted into light of second polarization (e.g., right-circular polarization) and reflected, in the polarization-conversion reflection unit 340, and may be incident to the input-coupler 350 through the waveguide 330.

Figure 10:
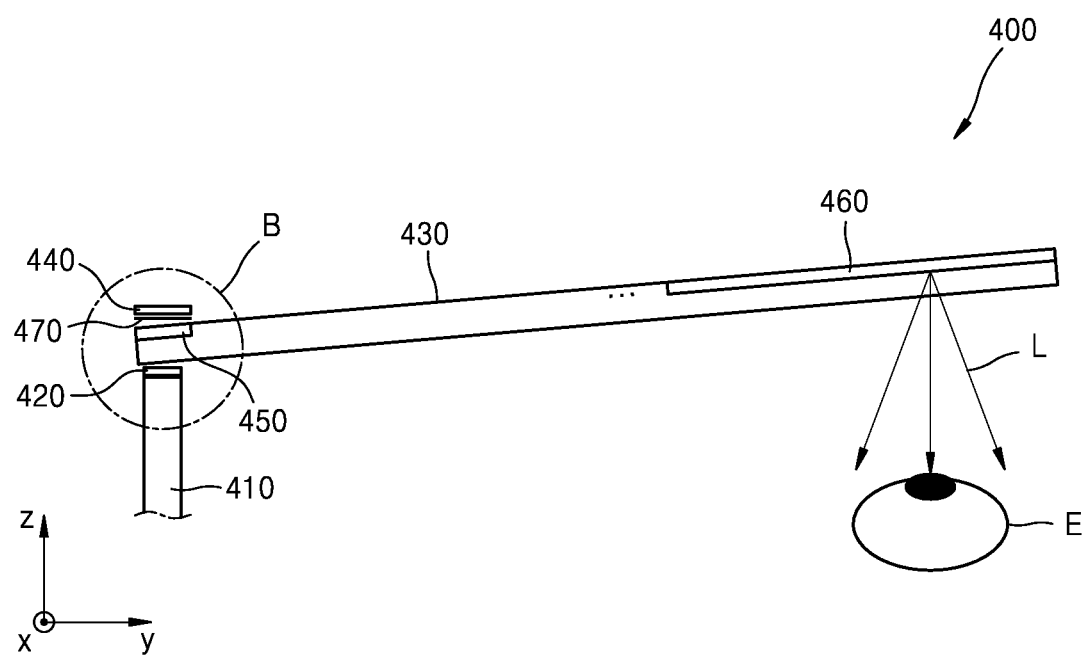
FIG. 10 shows an example in which a waveguide and a display engine are combined with each other in an AR device, according to an embodiment of the disclosure.
Figure 11:
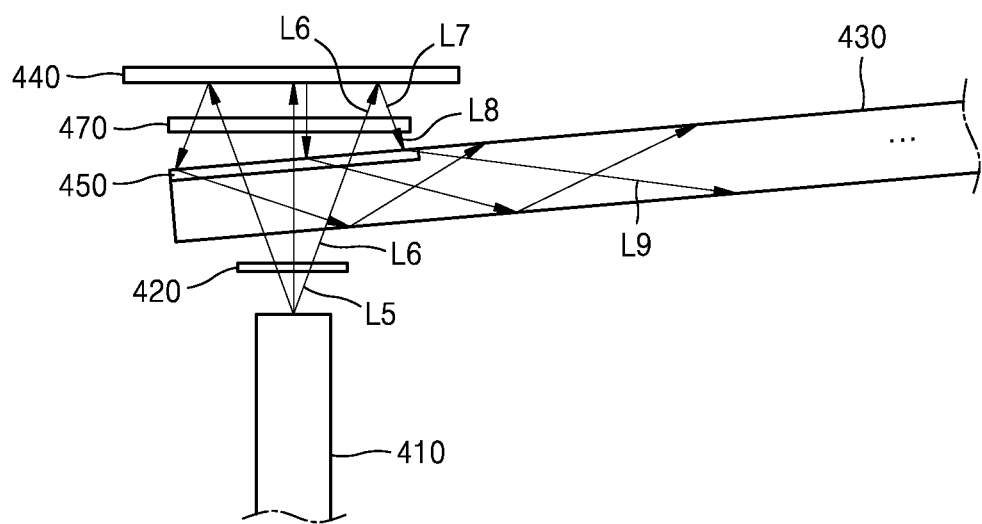
FIG. 11 is an enlarged view of a region B of FIG. 10.

FIG. 10 shows an example where a waveguide 430 and a display engine 410 are combined with each other in an AR device 400, according to an embodiment of the disclosure, and FIG. 11 is an enlarged view of a region B of FIG. 10. The AR device 400 according to the current embodiment of the disclosure specifies a case where the first polarization is linear polarization in the AR device 100 described with reference to FIGS. 1 and 2, and it will be understood by those of ordinary skill in the art that the AR device 200 is applicable to a glasses-type body structure of the AR device 100 described with reference to FIGS. 1 and 2.

Referring to FIGS. 10 and 11, the AR device 400 may include a display engine 410 that outputs light L5 of a virtual image, a polarization converter 420, a waveguide 430, a ¼ wave plate 470, and a reflective mirror 440. The light L5 output from the display engine 410 may be, but is not limited to, unpolarized. The ¼ wave plate 470 and the reflective mirror 440 may be understood as the polarization-conversion reflection unit 150 in the embodiment of the disclosure described with reference to FIG. 1.

In an embodiment of the disclosure, the polarization converter 420 may be a linear polarizer that polarization-converts the light L5 output from the display engine 410 into light L6 of linear polarization.

In an embodiment of the disclosure, the polarization converter 420 may be an x-axis linear polarizer that polarization-converts the light L1 output from the display engine 410 into the light L6 of the x-axis linear polarization. In this case, an input-coupler 450 may be a y-axis linear polarization diffraction grating that diffracts light L8 of the y-axis linear polarization without diffracting the light L6 of the x-axis linear polarization. The light L6 of the x-axis linear polarization, polarization-converted by the polarization converter 420, may pass through the waveguide 430 without being diffracted by the input-coupler 450. The light L6 of the x-axis linear polarization, passing through the waveguide 430, may become light L7 of left-circular polarization (or right-circular polarization) in the ¼ wave plate 470, may be reflected by the reflective mirror 440, and may become light L8 of right-circular polarization (or left-circular polarization). The light L8 of the right-circular polarization (or the left-circular polarization) may become light L9 of y-axis linear polarization while passing through the ¼ wave plate 470, and the light L9 of the y-axis linear polarization may enter the waveguide 430 by being diffracted by the input-coupler 450. The light L9 of the left-circular polarization, entering the waveguide 430, may be output outside the waveguide 430 by an output-coupler 460 and be directed toward the eyes E of the user.

In an embodiment of the disclosure, the polarization converter 420 may be a y-axis linear polarizer that polarization-converts the light L1 output from the display engine 410 into the light L6 of the y-axis linear polarization. In this case, the input-coupler 450 may be an x-axis linear polarization diffraction grating that diffracts the light L8 of the x-axis linear polarization without diffracting the light L6 of the y-axis linear polarization. The light L6 of the y-axis linear polarization, polarization-converted by the polarization converter 420, may pass through the waveguide 430 without being diffracted by the input-coupler 450. The light L6 of the y-axis linear polarization, passing through the waveguide 430, may become the light L7 of the right-circular polarization (or the left-circular polarization) in the ¼ wave plate 470, may be reflected by the reflective mirror 440, and may become the light L8 of the left-circular polarization (or the right-circular polarization). The light L8 of the left-circular polarization (or the right-circular polarization) may become the light L9 of the x-axis linear polarization while passing through the ¼ wave plate 470, and the light L9 of the x-axis linear polarization may enter the waveguide 430 by being diffracted by the input-coupler 450. The light L9 of the left-circular polarization, entering the waveguide 430, may be output outside the waveguide 430 by an output-coupler 460 and be directed toward the eyes E of the user.

Figure 12:
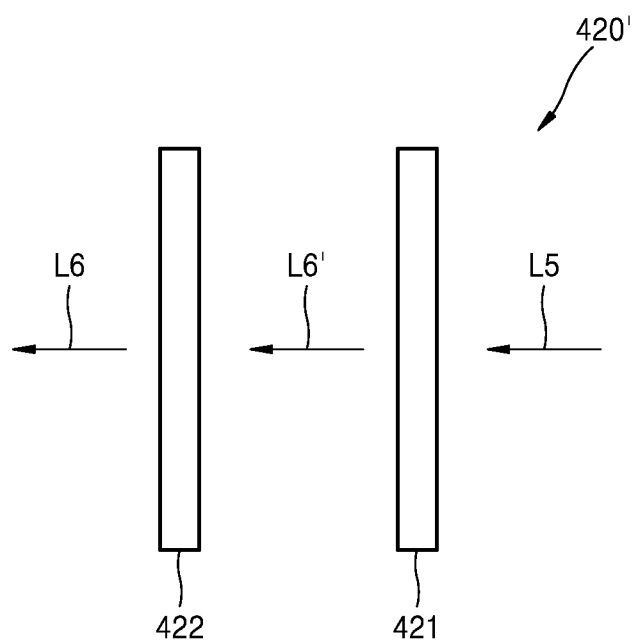
FIG. 12 is a view for describing a polarization converter according to an embodiment of the disclosure.

FIG. 12 is a view for describing a polarization converter 420' according to an embodiment of the disclosure. Referring to FIG. 12, the polarization converter 420' may include a linear polarizer 421 and a ¼ wave plate 422 that are sequentially arranged in the traveling direction of the light L1 output from the display engine 410. The ½ wave plate 422 may rotate a polarization direction of light L6' linearly polarized by the linear polarizer 421. The ½ wave plate 422 precisely adjust alignment of the linear polarizer 421 and the ¼ wave plate 422 by rotating the polarization direction of the light L6' linearly polarized by the linear polarizer 421 to match a direction of the ¼ wave plate 422.

Although the disclosure has been described mainly regarding an example applied to AR glasses worn on a face of the user, it will be apparently understood by those of ordinary skill in the art that the disclosure is also applicable to a device in the shape of goggles, a head mounted display (HMD), an AR helmet, or a head-up display (HUD), worn on a head part, and so forth. Furthermore, although the disclosure has been mainly described with an AR device, it will be apparent to those of ordinary skill in the art that the disclosure is applicable to a virtual reality device or a mixed reality device employing a waveguide.

While the AR device according to the disclosure has been shown and described in connection with the embodiments to help understanding of the disclosure, it will be apparent to those of ordinary skill in the art that modifications and variations may be made. Therefore, the true technical scope of the disclosure should be defined by the appended claims.

What is claimed is:

1. An augmented reality (AR) device comprising:
   a display configured to output light of a first polarization in a first direction;
   a polarization-conversion reflector provided opposite to an output side of the display, a reflective surface thereof extending along a second direction perpendicular to the first direction, the polarization-conversion reflector converting the light of the first polarization into light of a second polarization that is orthogonal to the first polarization and reflecting the light of the second polarization;
   a waveguide having a flat plate shape, a normal line of a flat surface of the flat plate shape being inclined with respect to the first direction, a side of the waveguide being provided between the display and the polarization-conversion reflector;
   an input-coupler inputting the light of the second polarization into the waveguide; and
   an output-coupler outputting light propagating in the waveguide.

2. The AR device of claim 1, wherein the display is provided at a side of the waveguide from which the light is output from the waveguide by the output-coupler.

3. The AR device of claim 1, wherein the display comprises:
   a display engine configured to output image light; and
   a polarization converter converting the image light output from the display engine into the light of the first polarization.

4. The AR device of claim 3, wherein the polarization converter comprises a circular polarizer polarization-converting the light output from the display engine into light of circular polarization, and
   the polarization-conversion reflector comprises a reflective mirror.

5. The AR device of claim 3, wherein the polarization converter comprises a linear polarizer and a ¼ wave plate that are arranged along a traveling path of the light output from the display engine, and
   the polarization-conversion reflector comprises a reflective mirror.

6. The AR device of claim 5, wherein the polarization converter further comprises a ½ wave plate provided between the linear polarizer and the ¼ wave plate.

7. The AR device of claim 3, wherein the display engine is further configured to output image light of linear polarization,
   the polarization converter comprises a ¼ wave plate, and
   the polarization-conversion reflector comprises a reflective mirror.

8. The AR device of claim 3, wherein the first polarization is right-circular polarization, and
   the input-coupler is a left-circular polarization diffraction grating diffracting light of left-circular polarization.

9. The AR device of claim 3, wherein the first polarization is left-circular polarization, and the input-coupler is a right-circular polarization diffraction grating diffracting light of right-circular polarization.

10. The AR device of claim 3, wherein the polarization converter comprises a linear polarizer polarization-converting the light output from the display engine into light of linear polarization, and
    the polarization-conversion reflector comprises a reflective mirror, and a ¼ wave plate provided between the waveguide and the reflective mirror.

11. The AR device of claim 3, wherein the polarization converter comprises a linear polarizer and a ½ wave plate that are arranged along a traveling path of the light output from the display engine, and
    the polarization-conversion reflector comprises a reflective mirror and a ¼ wave plate arranged between the waveguide and the reflective mirror.

12. The AR device of claim 3, wherein the first polarization is x-axis linear polarization, and
    the input-coupler is a y-axis linear polarization diffraction grating diffracting light of y-axis linear polarization.

13. The AR device of claim 3, wherein the first polarization is y-axis linear polarization, and
    the input-coupler is an x-axis linear polarization diffraction grating diffracting light of x-axis linear polarization.

14. The AR device of claim 1, wherein the AR device is AR glasses and further comprises a frame and temples connected at opposite ends of the frame, and
    the display is mounted in at least one side of the temples.

15. The AR device of claim 1, wherein the AR device is AR glasses or a head-mounted display device.

16. The AR device of claim 1, wherein the polarization-conversion reflector is fixed with respect to the optical axis of the light of the first polarization.

* * * * *